US012601651B2

(12) United States Patent
Hodot et al.

(10) Patent No.: US 12,601,651 B2
(45) Date of Patent: Apr. 14, 2026

(54) PROBE FOR MEASURING STATIC OR PARIETAL PRESSURE

(71) Applicant: THALES, Meudon (FR)

(72) Inventors: Romain Hodot, Valence (FR); Lilian Cauchard, Valence (FR)

(73) Assignee: THALES, Meudon (FR)

( * ) Notice: Subject to any disclaimer, the term of this patent is extended or adjusted under 35 U.S.C. 154(b) by 262 days.

(21) Appl. No.: 18/290,445

(22) PCT Filed: Jun. 3, 2022

(86) PCT No.: PCT/EP2022/065250
§ 371 (c)(1),
(2) Date: Nov. 13, 2023

(87) PCT Pub. No.: WO2022/258534
PCT Pub. Date: Dec. 15, 2022

(65) Prior Publication Data
US 2024/0247993 A1 Jul. 25, 2024

(30) Foreign Application Priority Data
Jun. 7, 2021 (FR) ...................................... 2105858

(51) Int. Cl.
| | |
|---|---|
| *G01L 19/14* | (2006.01) |
| *B64D 43/02* | (2006.01) |
| *G01L 19/00* | (2006.01) |
| *G01L 19/06* | (2006.01) |

(52) U.S. Cl.
CPC ............ *G01L 19/147* (2013.01); *B64D 43/02* (2013.01); *G01L 19/0061* (2013.01); *G01L 19/06* (2013.01)

(58) Field of Classification Search
None
See application file for complete search history.

(56) References Cited

U.S. PATENT DOCUMENTS

| | | | |
|---|---|---|---|
| 2003/0115948 A1* | 6/2003 | Rouse ........................ | G01P 5/14 73/170.02 |
| 2014/0331767 A1* | 11/2014 | Dis ......................... | G01P 5/165 73/431 |

FOREIGN PATENT DOCUMENTS

FR 3 067 469 A1 12/2018

* cited by examiner

*Primary Examiner* — Eric S. McCall
*Assistant Examiner* — Nigel H Plumb
(74) *Attorney, Agent, or Firm* — BakerHostetler

(57) ABSTRACT

A probe for measuring static or parietal pressure includes a pressure sensor module, a mounting plate equipped with air inlets which is intended to be mounted on the skin of an aircraft, and a shut-off means equipped with shut-off fingers which are configured to plug the air inlets of the mounting plate, and an actuator, controlled by a control module, configured to move the shut-off means in a translational movement so as to plug or unplug the air inlets of the mounting plate by the shut-off fingers.

10 Claims, 2 Drawing Sheets

PROBE FOR MEASURING STATIC OR PARIETAL PRESSURE

CROSS-REFERENCE TO RELATED APPLICATIONS

This application is a National Stage of International patent application PCT/EP2022/065250, filed on Jun. 3, 2022, which claims priority to foreign French patent application No. FR 2105858, filed on Jun. 7, 2021, the disclosures of which are incorporated by reference in their entireties.

FIELD OF THE INVENTION

The invention relates to probes for measuring static or parietal pressure.

Control of the flight of any aircraft requires knowledge of its airspeed, which is its speed with respect to the air, namely with respect to the relative wind. This airspeed is determined using probes that measure the static pressure Ps and the total pressure Pt. The total pressure Pt and static pressure Ps provide the modulus of this airspeed velocity vector.

BACKGROUND

The static pressure, in a moving fluid (water, air, etc.), is the pressure measured by a sensor traveling at the same speed as the fluid. In other words, the static pressure is the pressure of the fluid when stationary, i.e. the ambient pressure at the location in which the airplane is situated.

The dynamic pressure Pd represents the kinetic energy per unit volume within a moving fluid. It is therefore dependent only on the speed and the density of the fluid.

The total pressure Pt in a fluid (water, air, etc.) is the sum of the static pressure and of the dynamic pressure.

The measurements of total pressure, static pressure or angle of attack make it possible to calculate the airspeed with respect to the surrounding air, the altitude, the angle of attack or the side-slip of an aircraft.

Static-pressure probes for measuring the static pressure Ps are known.

The practice of replacing all these measurements by mounting what are commonly referred to as "parietal networks" or "static networks" or parietal probes, is also known. The pressures thus measured at several points on the fuselage of an aircraft are used to determine the value of all of the aforementioned anemometric parameters.

A network of parietal probes ultimately consists in creating a multitude of holes for measuring the pressure on the skin of the aircraft which pressure in the present application is referred to as the parietal pressure Pp.

In the case of military aircraft, the desire for stealth has led to the use of only non-protruding probes, such as on the B-2 stealth bomber which has only static-pressure probes. This installation uses the principle of parietal probes to determine the flight parameters from the field of pressures measured around the aircraft.

Whatever the location of the probes, these probes are subject to atmospheric attack, whether this be in flight or on the ground. The latter scenario is very tricky because, unlike in the flight phase, it is impossible, on the ground, to monitor the condition of the probes when the air data system is switched off.

One of the most feared dangers is that of the holes for probes intended to measure pressure becoming blocked. Specifically, these holes may become blocked on the ground, while the aircraft are parked, as a result of water, ice, dust, sand, or insects (such as mason wasps). These holes may also become blocked during flight, as a result of water and icing.

One traditional method for guarding against this is to cover the probes with covers when the airplane is on the ground. While this can prove to be effective on traditional forms of airplane, for which the probes are mounted with the air inlet axes directed horizontally (mounting plate vertical) or downward, it does not guarantee effective protection on airplanes of the flying wing type in which some of the probes are positioned with the air inlet axes directed upward.

Anemometry-probe protection devices comprising covers or external plugs positioned over the probes after landing for all types of airplanes are known.

While effective where probes are mounted laterally relative to the airplane, these devices do not seal properly if the probe is mounted on the top of the airplane, as it is in the case of a stealth airplane equipped with a parietal system.

This solution has a number of disadvantages:

it requires an operator, which comes at a high cost and is not necessarily possible in the case of a drone which might remain on standby in a zone where no human intervention is possible;

the operation may be complex depending on the position of the probe;

in flight, since the probe is not protected, contaminants that enter the system are not removed so the probe then requires maintenance afterwards;

any water that condenses needs then to be removed from the pneumatic circuit through a maintenance operation; and an omission to remove the plug before takeoff goes undetected, and will cause in-flight pressure-measurement failure.

SUMMARY OF THE INVENTION

An aim of the invention is to overcome the problems cited above, and notably.

One aspect of the invention proposes a probe for measuring static or parietal pressure comprising a pressure sensor module, a mounting plate equipped with air inlets which is intended to be mounted on the skin of an aircraft, and a shut-off means equipped with shut-off fingers which are configured to plug the air inlets of the mounting plate, and an actuator, controlled by a control module, configured to move the shut-off means in a translational movement so as to plug or unplug the air inlets of the mounting plate by the shut-off fingers.

Such a probe makes it possible to greatly limit ground maintenance, to offer a probe that is effectively protected against water, contaminants and nest-building insects, and to know the status of the plugging mechanism particularly in the event of failure.

According to one embodiment, the control module comprises an electronic control board.

In one embodiment, the probe for measuring pressure comprises an indexing device, and the shut-off means comprises a slot intended to receive one end of the indexing device so as to prevent the shut-off means from rotating during its translational movement.

This then prevents the shut-off means from rotating while it is effecting a translational movement.

In one embodiment, the shut-off means comprises an annular seal arranged on the upper part of the shut-off means.

The probe is thus sealed.

According to one embodiment, the shut-off means comprises an annular wiper seal arranged on the lower part of the shut-off means, i.e. on that part of the shut-off means that is closest to the airplane skin.

Thus, the system is self-cleaning.

In one embodiment, the shut-off means is equipped with a reservoir for storing water and contaminants.

This prevents water and contaminants from gaining direct access to the pressure sensor during flight.

For example, the reservoir is a blind hole in the underside face (the airplane-skin side) of the shut-off means.

According to one embodiment, a shut-off finger comprises an annular part made of elastomer arranged at the periphery of the shut-off finger.

This then keeps the measurement probe sealed when the aircraft is stationary on the ground.

In one embodiment, the probe for measuring pressure comprises an external cap.

According to one embodiment, the probe for measuring pressure comprises a supporting structure supporting the mounting plate, the pressure sensor module, the shut-off means, the actuator, the control module that controls the sensor, the indexing device, the O-ring seal, the wiper seal and the cap.

BRIEF DESCRIPTION OF THE DRAWINGS

The invention will be better understood on studying a few embodiments described by way of entirely non-limiting examples and illustrated by the attached drawing in which.

In all of the figures, elements having identical references are similar.

DETAILED DESCRIPTION

Figure 1:
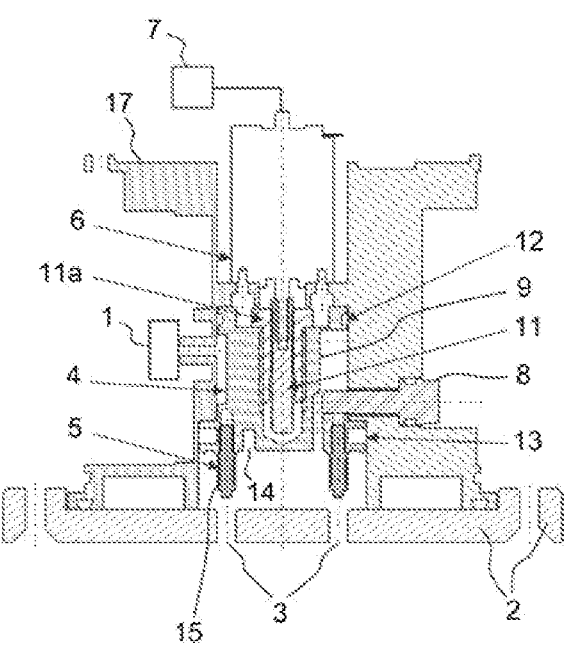
FIG. 1 schematically illustrates a probe for measuring static or parietal pressure according to one aspect of the invention.

FIG. 1 schematically depicts a probe for measuring static or parietal pressure comprising a pressure sensor module 1, a mounting plate 2 equipped with air inlets 3 which is intended to be mounted on the skin of an airplane, and a shut-off means 4 equipped with shut-off fingers 5 which are configured to plug the air inlets 3 of the mounting plate 2, and an actuator 6, controlled by a control module 7, configured to move the shut-off means 4 in a translational movement so as to plug or unplug the air inlets 3 of the mounting plate by the shut-off fingers 2.

The control module 7 may comprise an electronic control board.

The probe comprises an indexing device 8, and the shut-off means 4 comprises a slot 9 intended to receive one end of the indexing device 8 so as to prevent the shut-off means 4 from rotating during its translational movement.

The actuator 6 comprises a worm screw 11 rotationally connected to the actuator 6 to cause the shut-off means 4 to effect the translational movement. The worm screw 11 is mounted in a nut 11a.

The shut-off means 4 comprises an annular seal 12 arranged on the upper part of the shut-off means 4.

The shut-off means 4 comprises an annular wiper seal 13 arranged on the lower part, i.e. on the aircraft-skin side, of the shut-off means 4.

The shut-off means 4 is equipped with a reservoir 14 for storing water and contaminants, such as dust. The reservoir 14 is produced in the form of a blind hole in the underside face of the shut-off means 4.

A shut-off finger 5 comprises an annular part 15 made of elastomer arranged at the periphery of the shut-off finger 5. The rest of the shut-off finger 4 may be made of stainless steel.

A supporting structure 17 supports the mounting plate 2, the pressure sensor module 1, the shut-off means 4, the actuator 6, the control module 7 that controls the sensor 1, the indexing device 8, the O-ring seal 12, the wiper seal 13 and the cap 16.

The supporting structure 17 is the central mechanical component of the probe and performs a number of functions:

it is assembled with the mounting plate 2 of the probe in order to form the compensation chamber;

it receives and guides the shut-off means 4 and the indexing device 8 thereof;

it receives the actuator 6, for example a motor, and the worm screw 11;

it receives the various electronic boards: sensor 1, processing, power supply, etc.;

it guides the closure cap 16 when it is fitted.

This architecture is obtained through topological optimization making it possible to minimize the weight of the component while maintaining its stiffness.

Figure 2:
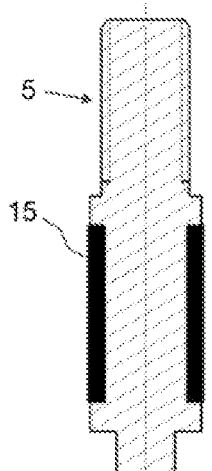
FIG. 2 schematically illustrates a shut-off finger according to one aspect of the invention.
Figure 3:
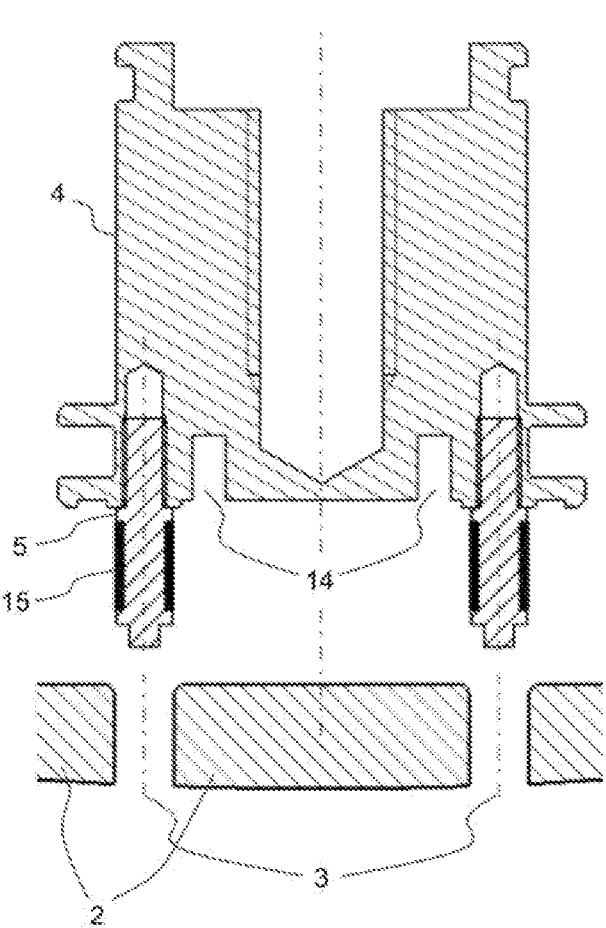
FIG. 3 schematically illustrates a shut-off means and the shut-off fingers thereof, according to one aspect of the invention.

FIG. 2 schematically depicts a shut-off finger, and FIG. 3 schematically depicts a shut-off means 4.

The shut-off means 4 prevents water and foreign bodies from entering the probe.

When the aircraft is on the ground it is in a closed position, and when the aircraft is in flight it is open.

The aircraft may be an airplane, a drone, a helicopter, etc.

The travel of the piston or shut-off means 4 may, in one preferred embodiment, be 12 mm so as to allow the shut-off fingers 5 to completely plug the air inlets 3 to the point that they are just proud of the aircraft (no cavity once closed). The indexing device 8 prevents the piston 4 from rotating when the actuator 6 is in action. The shut-off means 4 is fitted with two seals:

the wiper seal 13 in the bottom or lower part, which is able to push away any particles that may have become lodged in the piston 4; and the annular seal 12, for example an O-ring, which isolates the compensation chamber from the sensor 1 when the shut-off means 4 is in the closed position, thereby providing an additional level of security in the event of leaks around the shut-off fingers 5 of the shut-off means 4.

The shut-off fingers 5 are mounted at the lower end of the shut-off means 4 and achieve water tightness when the aircraft is not in flight. They plug the air inlets 3 in the mounting plate 2 in such a way that no particles can accumulate in the opening, for example when the aircraft is on the tarmac or in a storage hangar. They can be removed from outside the aircraft so as to be interchangeable and so that maintenance (extraction of particles and of water) can be performed on the compensation chamber.

A shut-off finger 5 may be made of stainless steel for the metal part, with overmolding for the elastomer part 15.

The plugging system effectively closes off the probe, sealing against water and dust and protecting the probe from nest-building insects.

End-of-travel detectors may be used to determine the status of the plugging mechanism and trace a fault. Automating the opening and closing of the probe eliminates the need for an operator.

The system is autonomous and requires neither maintenance nor a condensate-removal network.

The invention claimed is:

1. A probe for measuring static or parietal pressure comprising a pressure sensor module, a mounting plate equipped with air inlets which is intended to be mounted on the skin of an aircraft, and a piston equipped with shut-off fingers which are configured to plug the air inlets of the mounting plate, and an actuator, controlled by a control module, configured to move the piston in a translational movement so as to plug or unplug the air inlets of the mounting plate by the shut-off fingers.

2. The probe for measuring pressure as claimed in claim 1, wherein the control module comprises an electronic control board.

3. The probe for measuring pressure as claimed in claim 1, comprising an indexing device, and wherein the piston comprises a slot intended to receive one end of the indexing device so as to prevent the piston from rotating during its translational movement.

4. The probe for measuring pressure as claimed in claim 1, wherein the piston comprises an annular seal arranged on the upper part of the shut-off means.

5. The probe for measuring pressure as claimed in claim 1, wherein the piston comprises an annular wiper seal arranged on the lower part of the shut-off means.

6. The probe for measuring pressure as claimed in claim 1, wherein the piston is equipped with a reservoir for storing water and contaminants.

7. The probe for measuring pressure as claimed in claim 1, wherein a shut-off finger comprises an annular part made of elastomer arranged at the periphery of the shut-off finger.

8. The probe for measuring pressure as claimed in claim 7, wherein the reservoir is a blind hole in the underside face of the piston.

9. The probe for measuring pressure as claimed in claim 1, comprising an external cap.

10. The probe for measuring pressure as claimed in claim 1, comprising a supporting structure supporting the mounting plate, the pressure sensor module, the piston, the actuator, the control module that controls the sensor, the indexing device, the O-ring seal, the wiper seal and the cap.

* * * * *